United States Patent [19]

Miki

[11] Patent Number: 4,806,332

[45] Date of Patent: Feb. 21, 1989

[54] METHOD FOR PREVENTING ANHYDROUS POTASSIUM FLUORIDE FROM SOLIDIFICATION

[75] Inventor: Nobuhiro Miki, Osaka, Japan

[73] Assignee: Hashimoto Chemical Industries Co., Ltd., Osaka, Japan

[21] Appl. No.: 138,577

[22] Filed: Dec. 28, 1987

[51] Int. Cl.$^4$ ............................................. C01D 3/02
[52] U.S. Cl. ................................. 423/490; 423/499; 423/267
[58] Field of Search ............... 423/499, 267, 265, 490; 252/192; 23/293 R

[56] References Cited

U.S. PATENT DOCUMENTS

| | | | |
|---|---|---|---|
| 2,234,484 | 3/1941 | Weinig | 423/499 |
| 2,337,262 | 12/1943 | McOmie et al. | 252/192 |
| 2,854,341 | 9/1958 | Waldo | 423/499 |
| 2,958,576 | 11/1960 | Olstowski | 423/490 |
| 2,990,246 | 6/1961 | Scott et al. | 423/499 |
| 3,272,593 | 9/1966 | Fee | 423/499 |
| 3,383,317 | 5/1968 | Jacoby et al. | 423/267 |
| 4,224,290 | 9/1980 | Lynch | 423/499 |

FOREIGN PATENT DOCUMENTS

| | | | |
|---|---|---|---|
| 885368 | 11/1971 | Canada | 423/490 |
| 1266743 | 4/1968 | Fed. Rep. of Germany | 423/499 |
| 1270015 | 6/1968 | Fed. Rep. of Germany | 423/499 |
| 4725355 | 1/1974 | Japan | 423/499 |
| 61-286206 | 12/1986 | Japan | 423/265 |
| 729172 | 4/1980 | U.S.S.R. | 423/499 |
| 753790 | 8/1980 | U.S.S.R. | 423/499 |
| 994408 | 2/1983 | U.S.S.R. | 423/490 |
| 2146011 | 4/1985 | United Kingdom | 423/499 |

Primary Examiner—Robert L. Stoll
Assistant Examiner—Adriana L. Eng
Attorney, Agent, or Firm—Armstrong, Nikaido, Marmelstein & Kubovcik

[57] ABSTRACT

A method for preventing anhydrous potassium fluoride from solidification by causing the anhydrous potassium fluoride to absorb carbon dioxide gas.

3 Claims, No Drawings

4,806,332

METHOD FOR PREVENTING ANHYDROUS POTASSIUM FLUORIDE FROM SOLIDIFICATION

BACKGROUND OF THE INVENTION

The present invention relates to a method for preventing anhydrous potassium fluoride from solidification.

Hitherto, anhydrous potassium fluoride has been widely used as a flux in silver soldering, a reagent in introducing fluorine into organic compound, a catalyst in Michael reaction, etc.

The anhydrous potassium fluoride is essentially easy to solidify, and sometimes grows up to a large mass during the period of preservation in a packing bag making it difficulty to take it out when using, thereby requiring troublesome work of crushing the mass. Thus, there is a difficult not a little in handling anhydrous potassium fluoride in general. The anhydrous potassium fluoride is composed of a crystal structure of high hygroscopic property, and absorbs moisture to form $KF \cdot 2H_2O$ or $KF \cdot 4H_2O$ when the temperature is below 40° C. Accordingly, it is necessary to pay attention so as to prevent the anhydrous potassium fluoride from absorbing moisture even at the time of crushing the mass thereof. It is generally said that such solidification is caused by existence of moisture, but the true cause has not been theoretically made clear yet.

Several methods have been proposed in order to prevent the solidification. As one of such methods, it is known that the anhydrous potassium fluoride is additively coated with several weight % of inorganic insoluble fine powder such as diatomite, talc, etc. to prevent fine particles of the anhydrous potassium fluoride from being in contact with one another. It is also known as another method to adhere a surfactant. In these methods, however, there is a difficulty of how to perfectly adhere additive fine particles to the anhydrous potassium fluoride, and, moreover, even if the solidification is effectively prevented thereby, there remains another problem of contamination of impurities. Thus, the foregoing known methods cannot be adopted in practical use.

Under such circumstances, more attention has been actually paid to the manner of packing up to today in order to prevent moisture absorption as much as possible thereby preventing occurrence of solidification. In this sense, it has been usually adopted that, while outer packing is prepared of a paper bag, inner polyethylene packing is formed into a double structure, or that a cap of a metallic can be soldered after inserting a content (anhydrous potassium fluoride) therein.

In any of these methods, however, solidification takes place after preservation for a week or so making it difficult to take the content out.

SUMMARY OF THE INVENTION

Accordingly, an object of the present invention is to prevent anhydrous potassium fluoride from solidification.

Another object of the present invention is to provide a method for preventing anhydrous potassium fluoride from solidification without contamination of impurities.

A further object of the present invention is to provide a method for preventing anhydrous potassium fluoride from solidification in which solidification does not take place at all after a long period of preservation.

Other objects and features will become apparent in the course of the following description.

As a result of various researches and developments about how to prevent anhydrous potassium fluoride from solidification, the inventor finally found a novel method for the prevention which is quite different from the conventional methods.

That is, it was found that anhydrous potassium fluoride could be prevented from solidification by causing the anhydrous potassium fluoride to adsorb not less than 0.01 weight % of carbon dioxide gas and more preferably 0.03 to 2.0 weight % of carbon dioxide gas. When adsorbing less than 0.01 weight % of carbon dioxide gas, solidification prevention effect is not sufficiently attained. On the other hand, when adsorbing more than 2 weight % of carbon dioxide gas, solidification prevention effect remains unchanged, and application of such more than 2 weight % of carbon dioxide gas gives no particular influence to the effect, though uneconomical.

The anhydrous potassium fluoride which adsorbed carbon dioxide gas is hard to solidify as compared with one which has not adsorbing the gas, and performs more fluidity. It was further found that, particularly in the anhydrous potassium fluoride produced by the spray-drying process, specific surface area thereof was not reduced.

When causing anhydrous potassium fluoride to adsorb carbon dioxide gas, first moisture is completely removed from the anhydrous potassium fluoride by drying at about 100° to 150° C., then cooling it to not higher than 80° C., and putting it in contact with carbon dioxide gas. In this step, if the temperature is higher than 80° C., carbon dioxide gas is not adsorbed.

More specifically, 0.01 to 3.0 weight % of carbon dioxide gas can be adsorbed by anhydrous potassium fluoride in such a method wherein carbon dioxide gas is adsorped by putting the anhydrous potassium fluoride of a predetermined temperature in a state of residence for 10 to 30 minutes while drifting it in the carbon dioxide gas current, or in another method wherein a container is filled with carbon dioxide gas and anhydrous potassium fluoride is put in the container to be preserved therein for 10 minutes to several hours. It is also preferable that dry ice is put in a bag when packing. Either carbon dioxide gas in a gas cylinder or dry ice can be used as the aforementioned carbon dioxide gas.

DESCRIPTION OF THE PREFERRED EMBODIMENT

Several examples are described hereinafter. In this connection, characteristics found in the following examples were respectively measured as follows:

(1) Observation:

a bottle was filled with a sample which already adsorbed carbon dioxide gas, while another bottle was filled with a sample which has not adsorbed the gas yet. After preservation for a certain period, each bottle was turned sideways and upside down to determine whether or not each sample was solidified or still kept its fluidity.

(2) Measurement of angle of repose:

A funnel whose upper end is 70 mm in internal diameter and lower end is 10 mm in internal diameter was used. The funnel was secured with a space of 50 mm between a leg end of the funnel and the horizontal plane of the floor, and a screen of 30 meshes was placed on the funnel. Each sample was put on the screen and slowly swept by a brush to drop on the funnel. Height and diameter of a cone accumulatively formed on the floor by dropping were measured by five times and an average value thereof was calcurated.

(3) Crush test:

370 g of sample was put into a polyethylene bag, which was further put into a cylinder of vinyl chloride resin of 78 mm in diameter, and keeping a load of 150 g/cm$^2$ apllied thereto from above, the sample was left for a predetermined days.

After elapsing the predetermined days, the sample was taken out of the polyethylene bag and subject to a crush test to measure a solidification degree.

Method of crushing test

The sample was placed on a horizontal table, then a stainless steel plate was put on the sample, and further "weights" were put thereon one by one to measure the load at the time of crush, thus the measured load being established as solidification degree (g/cm$^2$).

EXAMPLE 1

41% aqueous solution of potassium fluoride was supplied to a spray dryer and dried with hot air of 450° C. Since the product was outputted at 100° to 150° C., 100 kg of the product was once stored in a stainless steel sealing container, and after being cooled to not higher than 60° C., 500 g of dry ice was put thereinto to adsorb carbon oxide gas. The sample was found having adsorbed 0.4 weight % of carbon dioxide gas. Then the sample thus obtained was preserved in a bottle, and after one week, solidification degree of the sample was measured together with the blank product (i.e., the comparative sample which was not subject to carbon dioxide gas adsorption process). Table 1 shows the result of measurement.

TABLE 1

Result of Measurement of Solidification Degree

| After | Fluidity | | Angle of repose (degree) | |
|---|---|---|---|---|
| | CO$_2$ absorbed product | Blank | CO$_2$ absorbed product | Blank |
| 1 day | flowing | flowing | 45 | 55 |
| 7 days | flowing | solidified | 45 | immeasurable |
| 30 days | flowing | solidified | 50 | " |
| 90 days | flowing | solidified | 53 | " |

Table 2 shows the result of measurement about change on standing of specific surface area made by BET method.

TABLE 2

Change on Standing of Specific Surface Area (m$^2$/g)

| | After | | | |
|---|---|---|---|---|
| | 1 day | 7 days | 30 days | 90 days |
| Blank | 1.02 | 0.65 | 0.44 | 0.32 |
| CO$_2$ absorbed product | 1.08 | 1.05 | 1.02 | 1.02 |

EXAMPLE 2

30% aqueous solution of potassium fluoride was supplied to a spray dryer and dries with hot air of 450° C. The product obtained at 120° to 130° C. was put into a stainless steel sealing container, and after being cooled to not higher than 60° C., 25 kg of the product was packed in a paper bag of polyethylene internal packing. Immediately after the packing, 400 g of dry ice was put thereinto. The sample was found having adsorbed 1.4 weight % of carbon dioxide gas. After a certain period, solidification degree and specific surface area of the sample were measured together with the blank product.

Tables 3 and 4 shows the result of measurement, respectively.

TABLE 3

Result of Measurement of Solidification Degree

| After | Fluidity | | Angle of repose (degree) | |
|---|---|---|---|---|
| | CO$_2$ absorbed product | Blank | CO$_2$ absorbed product | Blank |
| 1 day | flowing | flowing | 47 | 55 |
| 7 days | flowing | solidified | 51 | immeasuurable |
| 30 days | flowing | solidified | 56 | " |
| 90 days | flowing | solidified | 57 | " |

TABLE 4

Change on Standing of Specific Surface Area (m$^2$/g)

| | After | | | |
|---|---|---|---|---|
| | 1 day | 7 days | 30 days | 90 days |
| Blank | 0.79 | 0.65 | 0.59 | 0.40 |
| CO$_2$ absorbed product | 0.79 | 0.78 | 0.75 | 0.73 |

EXAMPLE 3

Aqueous solution of potassium fluoride was put into a crystallizer to deposit crystal, then the deposited crystal was separated by a centrifugal separator and dries at 130° to 150° C. The anhydrous potassium fluoride thus obtained was put into a stainless container filled with carbon dioxide gas, and after cooling it to 60° C., the anhydrous potassium fluoride was packed into a paper bag of double polyethylene internal packing. This anhydrous potassium fluoride was found having adsorbed 0.04 weight % of carbon dioxide gas. Then, 3 packages of such products and another 3 packages of anhydrous potassium fluoride which had not absorbed any carbon dioxide gas were placed on a pallet, and a load of 4 tons was applied thereon. After 7 days, 30 days and 90 days respectively, solidification degrees of them were respectively measured. Table 5 shows the result.

TABLE 5

Result of Measurement of Solidifiation Degree (g/cm$^2$)

| After | CO$_2$ absorbed product | Blank |
|---|---|---|
| 7 days | 60 | 779 |
| 30 days | 144 | 936 |
| 90 days | 261 | 1251 |

Effect of the Invention

As has been described so far, by causing the anhydrous potassium fluoride to adsorb carbon dioxide gas, the anhydrous potassium fluoride is not solidified, and, as the result, packed products thereof can be preserved over a long period without solidification. Furthermore, when using the product, it is no more necessary to crush it into powder and it becomes easy to handle the anhydrous potassium fluoride.

What is claimed is:

1. A method for preventing solidification of anhydrous potassium fluoride, said method comprising adsorbing carbon dioxide gas by the anhydrous potassium fluoride.

2. Method of claim 1, wherein the amount of carbon dioxide gas adsorbed by the anhydrous potassium fluoride is at least 0.01 weight %.

3. Method of claim 1, wherein the amount of carbon dioxide gas adsorbed by the anhydrous potassium fluoride is within the range of 0.01 to 3 weight %.

* * * * *